(12) United States Patent
Laraia et al.

(10) Patent No.: US 7,006,938 B2
(45) Date of Patent: Feb. 28, 2006

(54) REACTIVE SENSOR MODULES USING PADE' APPROXIMANT BASED COMPENSATION AND PROVIDING MODULE-SOURCED EXCITATION

(75) Inventors: Jose Marcos Laraia, Pocatello, ID (US); Masahisa Niwa, Osaka (JP); Robert P. Moehrke, Chubbuck, ID (US); Jose G. Taveira, Pocatello, ID (US)

(73) Assignees: AMI Semiconductor, Inc., Pocatello, ID (US); Matsushita Electric Works, Ltd., Kadoma (JP)

( * ) Notice: Subject to any disclaimer, the term of this patent is extended or adjusted under 35 U.S.C. 154(b) by 37 days.

(21) Appl. No.: 10/870,314

(22) Filed: Jun. 16, 2004

(65) Prior Publication Data

US 2005/0283330 A1 Dec. 22, 2005

(51) Int. Cl.
*G01C 19/00* (2006.01)
*G01C 25/00* (2006.01)
*G01D 18/00* (2006.01)
*G01F 25/00* (2006.01)
*G06F 19/00* (2006.01)

(52) U.S. Cl. .................... 702/104; 73/1.88
(58) Field of Classification Search ............... None
See application file for complete search history.

(56) References Cited

U.S. PATENT DOCUMENTS 5,902,925 A * 5/1999 Crispie et al. ............... 73/1.88

* cited by examiner

*Primary Examiner*—John Barlow
*Assistant Examiner*—Sujoy Kundu
(74) *Attorney, Agent, or Firm*—MacPherson Kwok Chen & Heid LLP; Gideon Gimlan

(57) ABSTRACT

Reactive sensors typically exhibit nonlinear response to temperature variation. Systems and methods are disclosed for compensating for the nonlinear and/or temperature dependent behavior of reactive sensors and for calibrating the post-compensation output signals relative to known samples of the physical parameter under measure. One call of embodiments includes a housing containing at least part of a reactive sensor, a monolithic integrated circuit and a timing reference. The integrated circuit includes a waveform generator for generating a sensor exciting signal, a detector for detecting the response of the sensor to the combination of the exciting signal and the under-measure physical parameter, a temperature compensating unit and the Pade Approximant nonlinearity compensating unit are tuned by use of digitally programmed coefficients. The coefficients calibrate the final output as well as compensating for non-linearity and temperature sensitivity.

35 Claims, 11 Drawing Sheets

100

200

300

400

500

600

700

800

900

1000

1100

REACTIVE SENSOR MODULES USING PADE' APPROXIMANT BASED COMPENSATION AND PROVIDING MODULE-SOURCED EXCITATION

FIELD OF DISCLOSURE

The present invention relates generally to electronic systems which compensate for analog transducer nonlinearities and/or temperature drift.

More specifically, the invention relates to integrated sensor modules where a transducer is packaged together with compensating means such as electronic compensating circuitry and where the transducer includes a reactive component such as an inductor or a capacitor.

2a. Cross Reference to Patents

The disclosures of the following U.S. patents are incorporated herein by reference:

(A) U.S. Pat. No. 6,198,296, issued Mar. 6, 2001 to Ivanov and entitled "Bridge sensor linearization circuit and method";

(B) U.S. Pat. No. 5,902,925, issued May 11, 1999 to Crispie et al. and entitled "System and method for high accuracy calibration of a sensor for offset and sensitivity variation with temperature";

(C) U.S. Pat. No. 5,848,383, issued Dec. 8, 1998 to Yunus and entitled "System and method for precision compensation for the nonlinear offset and sensitivity variation of a sensor with temperature";

(D) U.S. Pat. No. 5,764,067 issued Jun. 9, 1998 to Rastegar and entitled "Method and apparatus for sensor signal conditioning using low-cost, high-accuracy analog circuitry";

(E) U.S. Pat. No. 5,686,826 issued Nov. 11, 1997 to Kurtz et al. and entitled "Ambient temperature compensation for semiconductor transducer structures";

(F) U.S. Pat. No. 5,122,756 issued Jun. 16, 1992 to Nelson and entitled "Linearization of a sensing bridge circuit output";

(G) U.S. Pat. No. 4,419,620 issued Dec. 6, 1983 to Kurtz et al. and entitled "Linearizing circuits for a semiconductor pressure transducer";

(H) U.S. Pat. No. 4,362,060 issued Dec. 7, 1982 to Okayama, et al. and entitled "Displacement transducer";

(I) U.S. Pat. No. 5,798,692 issued Aug. 25, 1998 to Crispie, et al. and entitled "Digital compensation circuit for calibration of sensors";

(J) U.S. Pat. No. 5,995,033 issued Nov. 30, 1999 to Roeckner, et al. and entitled "Signal conditioning circuit including a combined ADC/DAC, sensor system, and method therefor";

(K) U.S. Pat. No. 6,104,231 issued Aug. 15, 2000 to Kirkpatrick, II and entitled "Temperature compensation circuit for a hall effect element";

(L) U.S. Pat. No. 4,591,795 issued May 27, 1986 to McCorkle and entitled "Signal conditioning circuit for L/R VDT sensors";

(M) U.S. Pat. No. 4,599,560 issued Jul. 8, 1986 to Sanford, et al. and entitled "AC excited transducer having stabilized phase sensitive demodulator circuit";

(N) U.S. Pat. No. 4,651,130 issued Mar. 17, 1987 to Pennell and entitled "Apparatus and method for retaining phase information for use with a multiple-coil inductive displacement sensor";

(O) U.S. Pat. No. 4,847,548 issued Jul. 11, 1989 to Lafler and entitled "Signal conditioner for a linear variable differential transformer";

(P) U.S. Pat. No. 4,857,919 issued Aug. 15, 1989 to Braswell and entitled "Method and apparatus for indicating the position of a core member of a variable differential transformer";

(Q) U.S. Pat. No. 4,954,776 issued Sep. 4, 1990 to Husher and entitled "Linear displacement transducers utilizing voltage component in phase with current that varies linearly with core displacement";

(R) U.S. Pat. No. 5,327,030 issued Jul. 5, 1994 to DeVito, et al. and entitled "Decoder and monolithic integrated circuit incorporating same";

(S) U.S. Pat. No. 5,399,964 issued Mar. 21, 1995 to Zoller and entitled "Peak amplitude detector for use in a synchronized position demodulator";

(T) U.S. Pat. No. 5,477,473 issued Dec. 19, 1995 to Mandl, et al. and entitled "Sensor-drive and signal-processing method";

(U) U.S. Pat. No. 5,717,331 issued Feb. 10, 1998 to Deller, et al. and entitled "Demodulator circuit for use with a displacement sensor to provide position information";

(V) U.S. Pat. No. 5,777,468 issued Jul. 7, 1998 to Maher and entitled "Variable differential transformer system and method providing improved temperature stability and sensor fault detection apparatus"; and (W) U.S. Pat. No. 5,594,388 issued Jan. 14, 1997 to O'Shaughnessy, et al. and entitled "Self-calibrating RC oscillator".

2b. Cross Reference to Patent Applications

The disclosures of the following U.S. patent applications are incorporated herein by reference:

(a) 2003/0173952 published Sep. 18, 2003 on behalf of Niwa, Masahisa and entitled "Position sensor"; and (b) Ser. No. 10/845,681 filed May 13, 2004 on behalf of Jose Marcos Laraia, Robert P. Moehrke, Jose G. Taveira, owned by one of the joint-assignees of this application, and originally entitled "Pade' Approximant Based Compensation for Integrated Sensor Modules and the Like".

2c. Cross Reference to Non-Patent Publications

The following publications are cited here for purposes of reference:

(a) Wolfram Research Mathworld Web site: http://mathworld.wolfram.com/PadeApproximant.html;

(b) Baker, G. A. Jr. and Graves-Morris, P. Padé Approximants. New York: Cambridge University Press, 1996;

(c) Yoshii et al, "1 Chip Integrated Software Calibrated CMOS Pressure Sensor with MCU, A/D Convertor, D/A Convertor, Digital Communication Port, Signal Conditioning Circuit and Temperature Sensor", Proceedings 1997 International Conference on Solid-State Sensors and Actuators, Chicago, Jun. 16–19, 1997, pg. 1485–1488;

(d) Mnif, K., "Compensation is critical in fitting analog pressure sensors to the application", ISD Magazine, July 2001.

(e) Travis, B., "Smart conditioners rub out sensor errors", EDN Magazine, February 2001.

(f) McGonigal, J., "Signal conditioning", Sensor Magazine, September 2003.

(g) Harrold, S., "Programmable analog ICs", Sensor Magazine, April 2003.

(h) Dunbar and Allen, "Performance grows with integration", EE Times, Oct. 7, 2003.

(i) Pallas-Areny and Webster—Sensors and Signal Conditioning, 2nd edition, John Wiley & Sons, New York, pp. 207–327, 2001.

(j) Yassa and Garverick, "A multichannel digital demodulator for LVDT/RVDT position sensors", IEEE J. Solid-State Circuits, vol. 25, no. 2, pp. 441–450, Apr. 1990.

(k) Crescini et al, "Application of an FFT-based algorithm to signal processing of LVDT position sensors", IEEE Trans. Instrum. Meas., vol. 47, no. 5, pp. 1119–1123, October 1998.

(l) Ford et al, "A novel DSP-based LVDT signal conditioner", IEEE Trans. Instrum. Meas., vol. 50, no. 3, pp. 768–773, Oct. 1998.

(m) AD598 Application Note, LVDT Signal Conditioner, Analog Devices, Rev. A, [no date].

(n) AD698 Application Note, Universal LVDT Signal Conditioner, Analog Devices, Rev. B, 1995.

(o) Rahim, Using the NE5521 signal conditioner in multifaceted applications, AN1182 Application Note, Philips Semiconductors, Dec. 1988.

(p) Unbehauen and Cichocki, "MOS Switched-Capacitor and Continuous-Time Integrated Circuits and Systems", Springer-Verlag Berlin Heidelberg 1989.

3. Description of Related Art

It is often desirable to accurately sense one or more of a plethora of physical parameters, for example: position, angle, velocity, acceleration, temperature, pressure, force, strain, luminosity, and fluid flow rate. Technological advances have enabled some of these parameters to be measured fairly accurately and reported electronically, sometimes even with the use of monolithic integrated and miniaturized electromechanical systems (MEMs). Even in cases where the sensing element(s) is/are discrete rather than integrated, they are often housed for convenience sake in a sensor module that further contains a discrete circuit and/or a monolithic IC for providing signal conditioning and/or other sensor supporting functions and/or communications supporting functions. Fields of application may include automotive, medicine, aerospace and factory automation.

Sensors of older design, such as LVDT's (Linear Variable Differential Transformers) are typically designed to provide relatively accurate measurements entirely on their own. Cost and size are not an issue. However, in various modern application areas such as automotive, the size, weight, cost, power consumption, and interface-ability of sensors can become very important issues, especially when sensors are to be embedded ubiquitously about a vehicle or other structure and coupled to a serial data channel in order to allow the structure to operate more smartly. It is highly desirable to provide low cost sensor modules that are small, accurate, reliable, easily interfaced with other parts of the automobile or other structure, and capable of operating in harsh environments. The search for appropriate sensors has led to a wide variety of sensing elements based on different physical/electrical principles, each one optimized for its uniquely specific application and environment. It is the specialty of the different sensors that raises problems. In particular, one class of sensors requires AC excitation in order to operate properly. The AC excitation may be combined with additional excitation by a DC voltage or current in order to shift the sensor operating point to a desired state (e.g., a specified operating temperature). Providing appropriate support for such AC-excited sensors can be a problem.

Electrical sensors may be broadly categorized as belonging to three large families of primary operation: resistive (R), inductive (L) and capacitive (C). Of course, various combinations of RLC functionality may be present in a given sensor. (See the above cited, textbook by Pallas-Areny & Webster.)

The present disclosure focuses on sensors that require AC excitation in order to operate. These operate typically on an inductive (L) and/or capacitive (C) basis rather than on an essentially all-resistive (R) basis.

Inductive sensors can provide a sensing function based on many different electromagnetic characteristics, including but not limited to variable reluctance and/or production of eddy currents. Inductive sensors may include those having linearly moving parts, those having rotary moving parts and those having no moving parts. Examples include linear and rotary differential transformers (LVDTs/RVDTs). Inductive sensors may be configured to conveniently sense displacement, position, and angle, or other physical parameters that can be conveniently converted to position or angle counterparts. Examples of such other physical parameters include pressure, weight, force, torque, acceleration and fluid speed.

Capacitive sensors typically rely on the capacitance variation that occurs between two or more conductors acting as capacitor plates. The cause of variable capacitance may be due to change in plate area, change in plate separation, and/or change of dielectric material between the plates. Capacitive sensors are useful for certain sensor applications such as proximity detection, measurement of small displacements, detection of pressure and of acceleration.

Many sensing elements, including inductive and/or capacitive ones, present unique requirements and limitations that need to be somehow circumvented or compensated for or supported by external means. For example, in order to operate properly, most inductive and/or capacitive sensors require an appropriate AC excitation source, in addition to energy that might be garnered from the physical attribute that is being sensed. Often, the electric or other output signal that is generated by the inductive and/or capacitive sensor in response to a given physical attribute (e.g., force, displacement, velocity, acceleration, temperature or any other physical parameter that can be detected and/or measured) is comparatively weak, distorted, or simply not adequate to interface directly with the electronic or other control system that is to rely on the sensor output signal. As such, signal amplification and distortion removal are often desirable. The utilized amplifiers, and/or the sensors themselves normally have variations in gain and offset errors due to perturbations in their fabrication processes. Thus, these components typically have to be individually calibrated. Many sensing elements present non-ideal response functions relative to the sensed parameter(s). The non-ideal response functions may be plagued by variation of response over different temperature ranges and/or by nonlinear response to linear change in the physical parameter being measured. Various applications may require correction of these non-ideal response behaviors to one extent or another. An appropriate electronic circuit, usually referred to as a "signal conditioning circuit," is often used to take care of these requirements and is commonly made an integral part of the sensor package. Both the sensing element and the signal conditioning circuit are commonly packaged into a single, environmentally sealed, physical unit known as a sensor module or, simply, an integrated sensor. Further explanations on sensor signal conditioning and examples of available solutions can be found in the articles by Mnif, Travis, and McGonigal cited above.

Although numerous signal conditioning solutions have been developed for sensors of the all-resistive type (e.g., resistive bridge networks), few are available for inductive (L) and/or capacitive (C) type. Part of the problem is that the AC excitation signal can alter sensor behavior. Three commercial integrated circuits are known to be available: AD598, AD698 (both from Analog Devices) and NE5521 (Philips Semiconductors), all of them dedicated to LVDTs and RVDTs. For the sake of simplicity, reference will be made to LVDT only, but it will be understood that LVDT signal conditioners generally can be used for RVDTs as well. LVDTs differ from generic inductive (L) and/or capacitive (C) type sensors in that the LVDTs are often designed to provide relatively accurate measurement irrespective of variations in their AC excitation signals or variations of manufacture from one LVDT to the next. Accordingly, the signal conditioning needs of LVDTs are generally less demanding than those of other kinds of reactive sensors.

There are three conventional approaches for providing LVDT signal conditioning. The first one uses a classic DSBSC (double-sided band suppressed carrier) AM synchronous demodulation technique. Both the AD698 and the NE5521 chips use this approach. In order to ensure accurate recovery of the sensing information and to avoid the $\cos(\phi)$ error (see Crescini et al), it is necessary to keep the primary and secondary coil waveforms in-phase. The DSBSC AM synchronous demodulation technique provides phase adjustment with the use of an adjustable potentiometer in a phase lead/lag network. Adjusting each potentiometer in a mass production environment is tedious, expensive and error-prone work. Even when done properly in the factory, it does not guarantee that phase matching will exist over all the sensor's temperature operating range in the field.

The second approach is used in the AD598 chip and it avoids the potentiometer trimming problem by instead using an asynchronous ratio-based approach. Sensing information is recovered by computing the quotient between the difference and the sum of the signals at the secondary coils of the LVDT. The computational circuitry results in a fairly complex product that is sold at a relatively high cost (see Ford et al). Moreover, the AD598 chip operates only with 5-wire LVDTs that have a central tap between the secondary coils. It cannot be used with mechanically simpler 4-wire LVDTs. Also, for a good accuracy and linearity to be achieved, the sum of the signals at the secondaries must be independent of the LVDT core position, which is not generally guaranteed by the LVDT manufacturers. All these reasons severely limit the scope of application for this second approach.

The third approach involves several different design techniques that employ digital signal processing (DSP). Yassa and Garverick (cited above) implement a monolithic 5-channel multi-channel digital demodulator using an adaptive AM demodulation algorithm based on prediction techniques. Each channel has a first-order $\Sigma$-$\Delta$ analog-to-digital converter (ADC) and a dedicated digital demodulator with a 32-bit word length. Crescini et al (cited above) improve on this by processing data in the frequency domain to avoid the $\cos(\phi)$ error. They use a digital algorithm implemented on a board with a commercial DSP running at 50 MHz and an analog interface circuit composed of a 14-bit DAC, followed by filters and a 14-bit ADC. Finally, Ford et al (cited above) improve the dynamic behavior of the previous solutions by implementing a modified DSP-based Costas receiver with commercial DSP interfaced by A/D and D/A converters. Although improving on different aspects of performance, these DSP solutions of the third approach are complex and expensive. They cannot be used in cost-sensitive LVDT applications.

Aside from the above three approaches, which are dedicated to LVDTs or RVDTs, it is believed that there are no commercially standard monolithic solutions for providing signal conditioning for other types of inductive and capacitive sensors (those that are not LVDTs). Therefore, users of the vast majority of reactive sensors are left to developing their own dedicated signal conditioning circuits, if they are going to have signal conditioning at all, where the dedicated signal conditioning circuits have a relatively large number of components and tend to be costly, bulky and consume more power.

Some conventional signal conditioning circuits focus on achieving good intrinsic linearity and accuracy for sensor outputs in general. They do not simultaneously attempt to provide calibration for the peculiarities of each individual sensing element or to compensate for the sensor's temperature variations. When high sensor accuracy is required over a wide temperature range, correction and calibration functions often have to be carried out by a plurality of dedicated circuits rather than one. This tends to increase overall module size, cost and power consumption. A need exists in the industry for a more compact and universal approach that accommodates the idiosyncrasies of individual sensors.

SUMMARY

Reactive sensors typically exhibit nonlinear response to the combination of an excitational signal (e.g., sinusoidally oscillating signal) and a physical parameter under measure (e.g., position of magnetic core member). Such sensors are typically sensitive to temperature variation. Systems and methods are disclosed for compensating for the nonlinear and/or temperature dependant behavior of reactive sensors and for simultaneously calibrating the post-compensation output signals relative to known samples of the physical parameter under measure (e.g., position).

One class of embodiments of the invention comprises a sensor-module housing where the housing contains at least part of a reactive sensor (e.g., the coil portion of a variable reluctance inductor), a monolithic integrated circuit and a timing reference (e.g., an oscillator crystal). The integrated circuit includes a voltage reference, a waveform generator for generating a sensor exciting signal that is synthesized from use of the timing reference and the voltage reference, a detector for detecting the response of the sensor to the combination of the exciting signal and the under-measure physical parameter, a temperature compensating unit, and a Pade' Approximant based, nonlinearity compensating unit. The temperature compensating unit and the Pade' Approximant nonlinearity compensating unit are tuned by use of digitally programmed coefficients. The coefficients calibrate the output signal of the sensor module as well as compensating for nonlinearity and temperature sensitivity in both the sensor and the signal path between the sensor and the sensor-module output signal. A highly accurate measurement of the under-measure physical parameter is made possible even though each of the sensor and compensating circuitry may be relatively simple, compact, and low in cost.

It may be seen from the above example that the present invention provides a solution wherein a relatively simple and low-cost reactive sensor (e.g., a simple coil and movable core member) can be used in combination with programmably-tuned compensation circuitry to thereby provide a combination that is accurate, low in cost and compact. Although the sensor may be relatively inaccurate and prone to temperature drift when characterized alone, the combination of the sensor and compensating circuitry can be made relatively accurate and insensitive to temperature changes. The invention provides nonlinearity and temperature compensating methods and corresponding structures that can be used with reactive sensors that require AC excitation sources as well as individualized output correction. Structures in accordance with the invention can be made compact, with relatively low power consumption and yet they can be made highly accurate because they are programmably adjustable to accommodate the idiosyncrasies of individual sensors. Structures in accordance with the invention can be made flexible so as to be used in a wide range of applications while allowing for low cost mass production. Methods and structures disclosed herein allow for sensor excitation and calibration to take place as an integral part of nonlinearity compensation, where both functions may be implemented by the same circuit. Embodiments in accordance with the invention may be implemented as monolithic integrated circuits which use mostly analog techniques for providing signal conditioning that is free of digitization problems (e.g., quantization error and/or sample time hold up).

In one embodiment, a monolithic integrated and programmable signal conditioning circuit is provided for sensors that require AC excitation. The circuit comprises a programmable source for synthesizing a substantially sinusoidal or other excitation waveform, a peak detector with low-pass filtering functionality, a temperature compensation circuit, a nonlinearity compensation and calibration circuit, and an output interface. A programming interface is provided to allow the circuit to be optimally configured for specific sensors.

More specifically, in accordance with one aspect of the present invention, techniques are provided for implementing nonlinearity compensating functions based on the mathematics of Padé Approximants. Padé Approximants may be used to produce expandable approximations of desired mapping functions, where the approximations may be expressed as a ratio of two power series, where each power series includes a respective set of coefficients. A given Padé Approximant mapping function may be defined and/or fined-tuned by adjusting either or both of its numerator and denominator coefficients. Padé approximation mapping functions are suitable for modeling nonlinear physical behavior including behavior whose mathematical models contain poles or like singularities. In particular, it is believed that the rational functions provided by the Padé Approximant approach generally provide a better fit for modeling real world phenomenon than do the more commonly used Taylor expansions, where the latter disadvantageously call for a larger number of terms and associated coefficients in order to define an approximation to a desired degree of accuracy and precision.

Relatively accurate Padé approximations can be implemented by using low-order rational functions and correspondingly simple, inexpensive and substantially analog, nonlinearity compensating circuits. In one embodiment, all that is called for is: (a) a variable gain analog amplifier, (b) an analog offset adder coupled to an output of the amplifier; (c) a feedback attenuation element coupled to an output of the offset adder; and (d) a gain-setting circuit for the variable gain analog amplifier, where the gain-setting circuit generates a gain signal representing a first gain factor G, multiplied by one minus the output of the feedback attenuation element.

The resulting circuit behavior may be expressed as:

$$Vout = G \cdot (1 - k_{vf} V_{out}) \cdot V_{in} + V_{off} \quad \{Eq.\ 1a\}$$

By solving equation Eq. 1a for the output voltage, $V_{out}$, Eq. 1a may be re-expressed as:

$$V_{out} = \frac{G \cdot Vin + voff}{G \cdot kvf \cdot Vin + 1} \quad \{Eq.\ 1b\}$$

Then, by substituting $x=V_{in}$, $y=V_{out}$, $a=G$, $b=v_{off}$, and $c=G \cdot k_{vf}$, equation Eq. 1b may be re-expressed as the first order Padé Approximant:

$$y(x) = \frac{P_1(x)}{Q_1(x)} = \frac{ax+b}{cx+1} \quad \{Eq.\ 1c\}$$

Under a more generalized formulation, the expression above (Eq. 1c) may be re-expressed as an $n^{th}$ order Padé Approximant:

$$y_2(x) = \frac{P_2(x)}{Q_2(x)} = \frac{P_n x^n + P_{(n-1)} x^{n-1} + \ldots + P_0}{Q_n x^n + Q_{(n-1)} x^{n-1} + \ldots + 1} \quad \{Eq.\ 1d\}$$

Moreover, the orders of the polynomials in the numerator and denominator may be different ($m^{th}$ and $n^{th}$) from one another.

It will be seen that a wide variety of mapping functions can be approximated by appropriate adjustment of the three coefficients, a, b and c in the first order equation, Eq. 1c. For example, by setting c=0, the linear mapping equation, y=ax+b is obtained. By setting a=0, the nonlinear mapping equation, y=b/(cx+1) is obtained. The input variable, x, may be replaced by the translated variable $(x-x_0)$ to obtain a horizontally translated mapping function. The output variable, y, may be replaced by the translated variable $(y-y_0)$ to obtain a vertically translated mapping function. Either of x and y may additionally have its polarity inverted: x'=−x or y'=−y in order to provide for 180 degree rotations of the mapping function on the x-y graphing grid.

A nonlinearity compensation circuit in accordance with the invention can be placed anywhere in the analog signal path of the sensor module. The compensation function can include compensation for the compensator's internal nonlinearities and for nonlinearities of other circuits in the reporting path. Because the compensation does not necessitate adjustment of a sensor excitation signal (as might for example, certain resistance bridge circuits), the sensor excitation signal may be kept constant or it may be made ratiometric to the supply voltage. This allows for a simpler design and can help to ensure that the sensor excitation voltage or current will be within an optimal range as may be required by the unique circumstances of each sensor and its use. As an additional benefit, the nonlinearity compensation circuit can also provide sensor calibration, thus further reducing overall complexity and cost. When compared to the predominantly digital methods for nonlinearity compensation, where large lookup tables, microprocessors and/or the like are employed, the embodiments in accordance with the present invention enable much simpler and smaller circuits that can be built at significantly lower costs.

Although they are disclosed in the context of sensing applications, the function mapping circuits and techniques here disclosed can be general in scope and can be applied in other uses, such as audio, video, imaging, or in any situation where a nonlinear mapping function is to be electronically provided.

A method is provided in accordance with the invention for mapping an input signal to a corresponding output signal. One embodiment of the method comprises: (a) providing a programmable transforming unit that operates in accordance with a Pade' Approximant ratio having respective numerator and denominator coefficients; and (b) programmably adjusting the transforming unit to thereby establish respective numerator and denominator coefficients that cause the transforming unit to provide a desired Pade' Approximant mapping between a supplied input signal having at least three (3) input reference points and a corresponding output signal having at least three (3) standardized output values on a one-for-one basis corresponding to said at least three (3) input reference points.

Other aspects of the invention will become apparent from the below detailed description.

BRIEF DESCRIPTION OF THE DRAWINGS

The below detailed description section makes reference to the accompanying drawings, in which.

DETAILED DESCRIPTION

Figure 1:
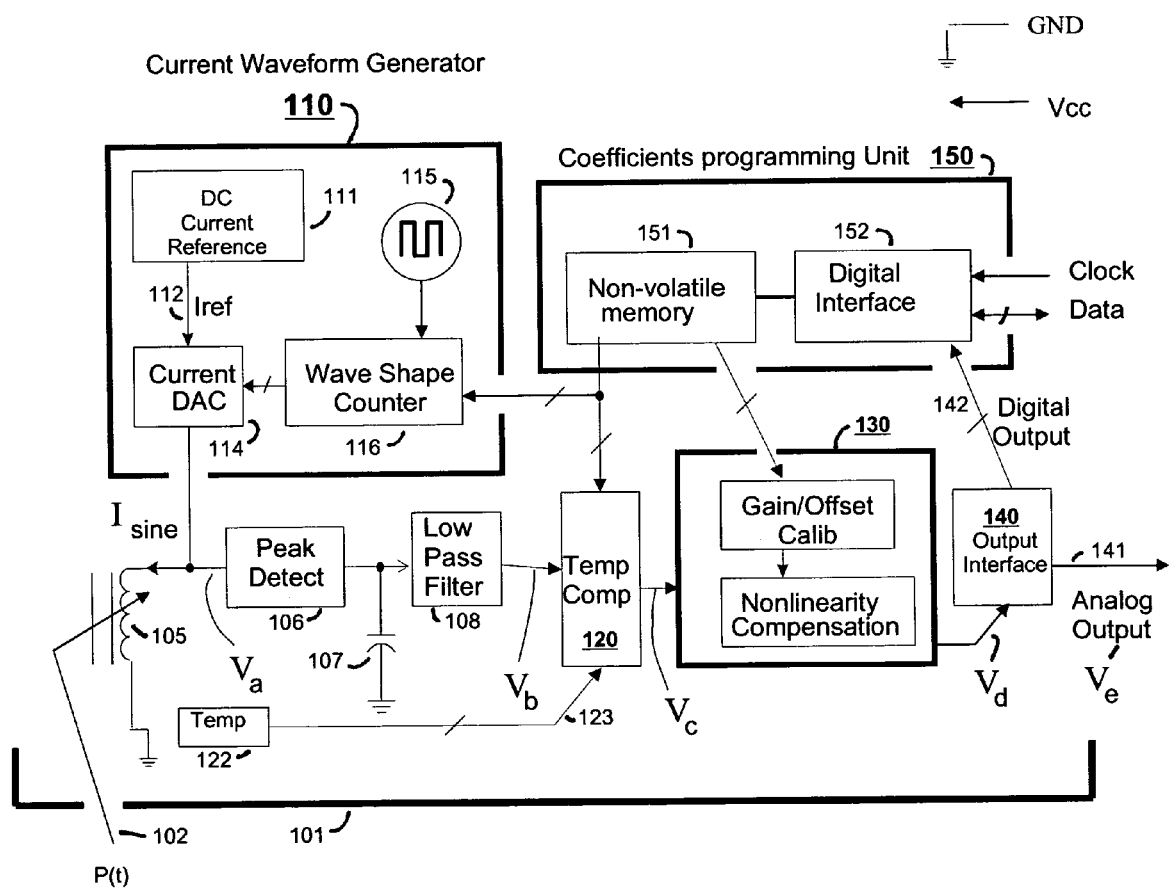
FIG. 1 is a block diagram of a sensor module which, in one embodiment, comprises a printed circuit board to which are mounted a sensor coil, a monolithic integrated circuit and an oscillator crystal.

The following description is illustrative only and not limiting. Referring to FIG. 1, a block diagram is provided of a sensor module 100 including a variable reluctance sensor 105. In one embodiment, the module comprises a printed circuit board (not shown) to which are mounted a sensor coil, a monolithic integrated circuit (IC, not separately shown) and an oscillator crystal. The printed circuit board is surrounded by a protective housing 101 (partially shown) such as a hermetically sealed, non-magnetic metal casing (e.g., aluminum). The coil is positioned near a wall of the protective housing 101 so as to interact with an external and movable, magnetic core member 102. An external physical parameter, P(t), such as a position of the movable, magnetic core member 102, alters the reluctance of the so-formed sensor 105.

A current generator 110 is provided within the IC for driving a periodic current signal, $I_{sine}$ through the variable reluctance sensor 105, where $I_{sine}$ is digitally synthesized to have a pseudo sinusoidal or other periodic waveform. Peak detector 106 has a high impedance input terminal (e.g., greater then about 100KΩ) for sensing the peak voltage developed across sensor 105. The input impedance of the peak detector 106 is sufficiently large to avoid substantially altering the response of the variable reluctance sensor 105 to the synthesized $I_{sine}$ signal and to the external physical parameter, P(t).

The inductive sensor (e.g., coil and magnetic flux paths and parasitic capacitances) 105 may be modeled as having a certain complex impedance corresponding to P(t) where the impedance includes resistive and inductive series components. At a given temperature and excitation frequency, the resistive component $Z_{dc}$ is typically constant over all the sensing range, whereas the series inductive component, $Z_{ac}$ is typically a function of the relative magnetic coupling between the coil and its magnetic flux paths (e.g., flux through a displaceable core). Physical parameters (P(t)) such as displacement, angle, or position can be conveniently measured based on this principle when the inductive sensor 105 is embedded as part of a suitable mechanical structure that causes $Z_{ac}$ vary as a function of the targeted physical parameter, P(t).

In order to measure $Z_{ac}$, an adequate excitation current $I_{sine}$ may be driven through the sensor coil and the resulting voltage across the coil may be detected. Equations Eq. 1a and 1b below show the coil voltage $V_a$ resulting from a current excitation having DC and AC components, where the AC impedance $Z_{ac}$ has real and imaginary components:

$$Va = Zdc \cdot Idc + |Zac| \cdot |Iac| \qquad \text{Eq. 1}a$$

$$|Zac| = \sqrt{Re\{Zac\}^2 + Im\{Zac\}^2} \qquad \text{Eq. 1}b$$

Figure 2:
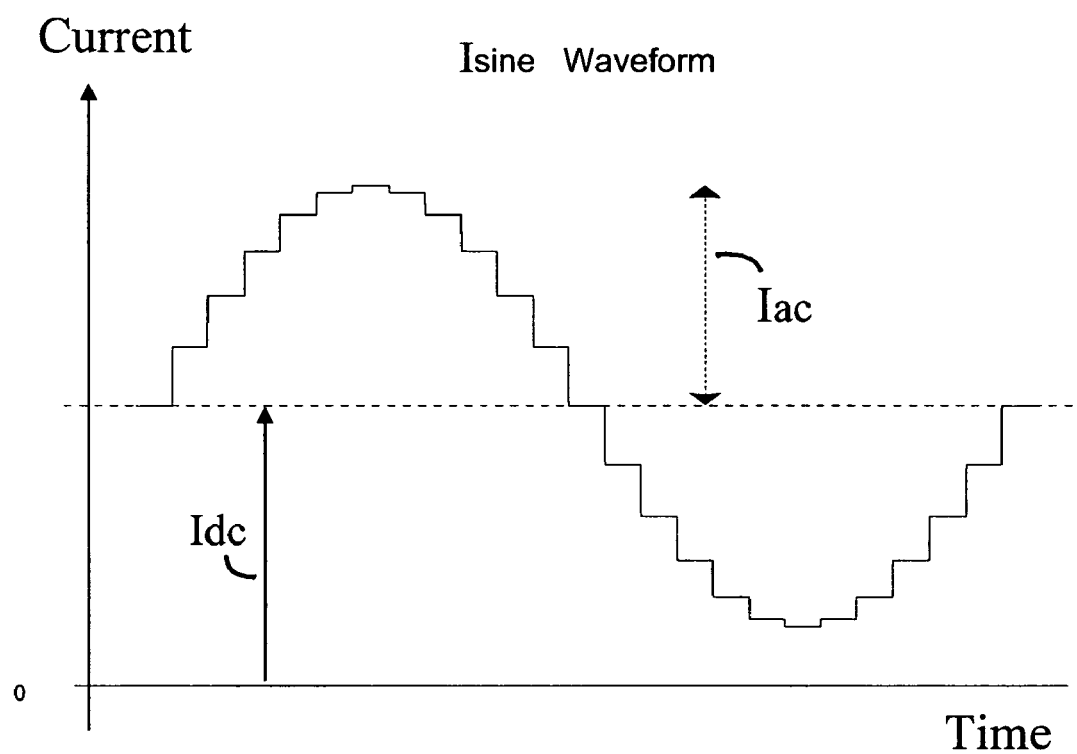
FIG. 2 is a current versus clock cycle graph showing a pseudo-sinusoidal, discrete waveform that may be used for exciting the reactive sensor of FIG. 1.

For $V_a$ to be a useful indication of coil impedance and, therefore, of the sensed physical variable P(t), the current excitation should have a fixed, primary frequency and a stable, well-controlled amplitude. It is undesirable to have a large, higher harmonic content in the frequency domain because the developed voltage, $V_a$ may then represent the response of parasitic components (e.g., parasitic capacitors or inductors) that do not respond appropriately to variations of the sensed physical variable. P(t). FIG. 2 shows a repeatable discrete-steps waveform (e.g., a digitized waveform) that can provide such low harmonic characteristics. The number of steps in the waveform, the width of each step and/or the granularity between steps may depend on the type of step-magnitude/width generator (e.g., digitizer) used and on the capacity of the memory that supports the step-magnitude/width generator (e.g., digitizer). FIG. 1 shows a current waveform generator 110 that can produce such a quasi-sinusoidal waveform. A DC current reference $I_{ref}$ is generated from block 111 by using, for example, a stable voltage source, such as a bandgap voltage reference, and a fixed resistor. A square wave oscillator, from an on-board crystal oscillator or another substantially stable frequency source 115, clocks a waveshape counter 116 that has been suitably programmed to count out sample points of a desired waveform (e.g., that of FIG. 2). Lines carrying digital signals are denoted in FIG. 1 by slashes extending through those lines. The digital output signal from the counter 116 is applied to a current-outputting, digital-to-analog converter (current DAC) 114. The current DAC may be comprised of a parallel set of digitally selectable current mirrors all referenced to the $I_{ref}$ signal on line 112. Finally, the current DAC generates analog current steps (samples) that are predetermined fractions or multiples of $I_{ref}$. In one embodiment the samples are chosen to closely resemble a sinewave as is shown in FIG. 2. In one embodiment, the waveshape counter 116 is programmably responsive to digital data stored in a rewritable memory (e.g., nonvolatile FLASH memory) 151 of control unit 150 so that different ones of predetermined waveforms (e.g., triangle, sawtooth, trapezoidal, etc., and/or different DC bias levels) can be selected for application to different kinds of reactive sensors 105. Optional internal filters may be provided in the current DAC 114 for smoothing out the current transition steps. In this way, it is possible to synthesize quasi-sinusoidal or other smooth current waveforms with well-controlled $I_{dc}$ and $I_{ac}$ components (see FIG. 2) and accurately defined primary frequencies as well as limited harmonic content. In one embodiment, the reference clock source 115 is made programmably responsive to data stored in a rewritable memory of unit 150 so that different ones of predetermined primary frequencies can be generated as may be appropriate for different sensors 105.

Although one embodiment uses a resonant crystal as part of the reference timing source 115, it is within the contemplation of the disclosure to use other timing references that may be more or less accurate, including those which are integrated into the monolithic IC that contains other parts of the waveform generator 110. Examples include ceramic resonator oscillators and self-calibrating RC oscillators. More specifically, U.S. Pat. No. 5,594,388 (O'Shaughnessy et. al) discloses a self-calibrating oscillator for integration in an IC. This self-calibrating oscillator may be made more accurate by, for example, using EEPROM trimming to center its frequency and by using an external resistor for reducing temperature dependency. Alternatively, a laser-trimmed or otherwise-trimmed RC oscillator may be used where both the trimmed R and the C may be internal to the IC.

Although one embodiment uses a DAC 114 for generating digital steps of the synthesized, sensor-exciting signal (e.g., $I_{sine}$), it is within the contemplation of the disclosure to use other generators of discretely-assembled waveforms including those where the discrete waveform sections have modulated pulse width and/or a magnitude versus time that is other than that of a step function.

Due to the application of the sensor-exciting signal (e.g., $I_{sine}$) and as the sensed physical parameter P(t) changes over time, the sensor reactance will be correspondingly modulated and the voltage produced across the sensor will reflect the combined effects of the sensor-exciting signal and the changing physical parameter P(t). The coil voltage, $V_a$ that results from application of the excitation current, $I_{sine}=I_{dc}+I_{ac}$, will be an amplitude modulated (AM) voltage signal whose carrier frequency is generally the same center frequency as that used by the excitation current while the envelope of the AM signal contains the sensed information attributed to the physical parameter, P(t). Therefore, the envelope voltage of the $V_a$ waveform will generally be a monotonic function representing the to-be measured, physical parameter, P(t), such as the position of core member 102. In order to extract the envelope voltage, the $V_a$ voltage signal is applied to a peak detector circuit 106. This peak detector circuit 106 tracks the $V_a$ waveform during the rising edges of $V_a$ voltage pulses (the pulses do not have to be sinusoidal) and for each pulse, it pumps a corresponding amount of charge into a capacitor 107 to represent the peak magnitude of the rising side of the voltage pulse. When a $V_a$ voltage pulse reaches its peak and thereafter begins to decrease in magnitude, the peak detector circuit 106 stops pumping charge into the capacitor 107 and the capacitor is allowed to start discharging slowly, at a predetermined constant rate, until its voltage drops down to or slightly below the voltage of the next rising edge of the $V_a$ signal. At that point, the peak detector circuit 106 starts pumping new charge into the capacitor 107. The voltage across capacitor 107 should then roughly track the envelope of the pulsed $V_a$ voltage signal. A low-pass filter 108 is optionally provided to smooth out the voltage of capacitor 107 and to reduce noise and distortions due to the carrier frequency harmonics of the digitally synthesized excitation current, $I_{sine}$.

Two additional blocks (not shown) may be optionally added to the module 100 of FIG. 1 between sensor 105 and peak detector 106. In cases where the coil voltage $V_a$ is relatively low (e.g., <<1volt), the peak detector may be preceded by a high impedance voltage amplifier. For EMI protection and further reduction in noise and harmonic content, a simple RC low-pass filter or other filter with corner frequency higher than the carrier frequency may be additionally or alternatively inserted between the sensor 105 and the peak detector 106.

Figure 3:
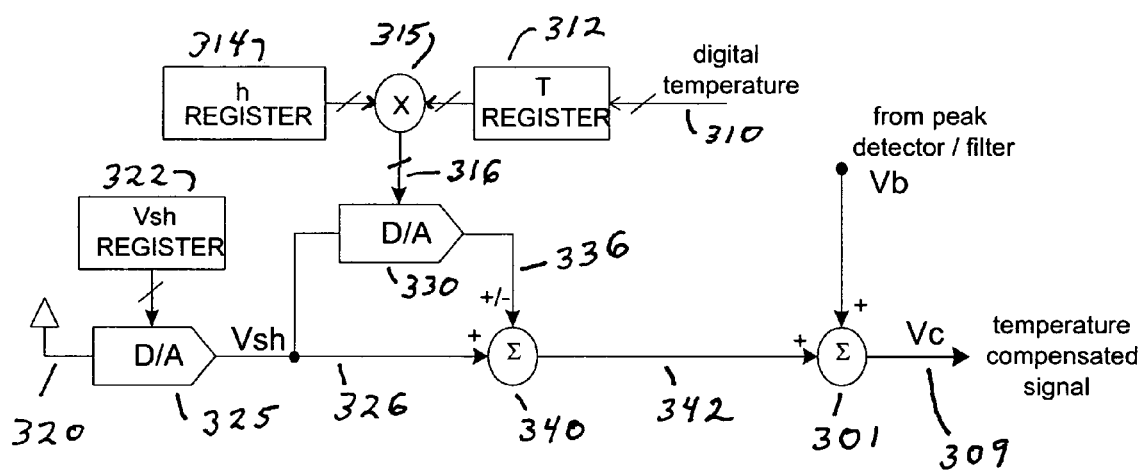
FIG. 3 is a schematic diagram of a linear temperature compensating circuit that may be used in the sensor module of FIG. 1.

Referring to element 120 of FIG. 1, reactive sensors such as 105 generally exhibit some variation of response over temperature. Temperature compensation may be required in order to provide a desired degree of sensor accuracy. In FIG. 1, a temperature detector 122 is positioned adjacent to coil 105 and supplies a digital, temperature-indicating signal 123 to unit 120. In an alternate embodiment, signal 123 can be analog. Temperature compensation can be performed in a number of ways and is highly dependent on the nature of the sensing element and the sensor construction. For instance, U.S. Published Application No. 2003/0173952 describes an inductive position sensor receiving an excitation current with constant and alternating components similar to those described above. If the temperature dependence of the resulting voltage ($V_a$) is fairly linear and constant across all of the intended sensing range and all expected selections of $I_{dc}$ and $I_{ac}$, then a linear compensating circuit may be used. A simple circuit for providing linear temperature compensation is shown in FIG. 3. A linear, temperature dependent, offset voltage is simply added in adder 301 to $V_b$, the output signal from the low pass filter 108 (or Vb can instead be the output signal from the peak detector if the optional low pass filter 108 is not used). With appropriate selection of the digitally-defined parameters, $V_{sh}$ and h, the resulting voltage $V_c$ on line 309 can be made substantially constant over temperature per the following equation, Eq. 2:

$$V_c = V_b + V_{sh} \cdot (1 \pm h \cdot T) \qquad \text{Eq. 2}$$

In FIG. 3, a digital representation 310 of sensor temperature is periodically written into register 312. A sensor-associated, slope factor, h, is stored in register 314. Digital multiplier 315 produces the digital product signal, h·T on line 316. A digital representation of a sensor offset value is stored in register 322. A reference voltage is provided to the analog reference input of D/A converter 325. The corresponding analog voltage, $V_{sh}$, appears on output line 326 of the D/A converter. A second D/A converter 330 causes the analog voltage, $V_{sh}$ to be multiplied by the h·T factor on line 316 to thereby produce the analog product signal, h·T·V$_{sh}$ on line 336. Analog adder 340 sums the signals on lines 326 and 336 to thereby produce the analog sum signal, V$_{sh}$·(1±h·T) on line 342. Adder 301 then adds in V$_b$, as explained above. Switched capacitance DAC's and/or switched capacitance adders may be used to conserve power. See the above-cited work of Unbehauen and Cichocki as an example of how to implement switched capacitance DAC's and/or switched capacitance adders.

Many other temperature compensation methods might be additionally or alternatively used, depending on the specific sensor 105 (FIG. 1) and the desired accuracy requirements. Among the other possible, temperature compensation methods are the steps of adjusting the sensor excitation signal in response to the temperature-indicating signal 123, and/or using EEPROM-based lookup tables to insert compensating factors in response to the temperature-indicating signal 123, and/or dividing the sensing range into multiple piecewise-linear segments and selecting different coefficients by using the temperature-indicating signal 123 as an address bit coupled to memory unit 151, and/or applying a polynomial correction function in response to the temperature-indicating signal 123.

Referring to unit 130 of FIG. 1, reactive sensors (i.e., 105) typically exhibit nonlinear response behavior to linear variations of the physical parameter under measure, P(t). Reactive sensors may additionally or alternatively exhibit response behavior that needs calibration in terms of gain and/or offset in order to provide accurate measurements of the physical parameter under measure, P(t). The present inventors found it advantageous to compensate for nonlinearity and/or calibration errors separately from the compensation for temperature drift because otherwise, crossover effects from one function to the other can overly complicate matters. Nonetheless, it is within the contemplation of the disclosure to provide transformation from the detected sensor-response signal V$_b$ to a correspondingly corrected, sensor-response signal V$_e$ by using a single step transformation rather than the plural ones (120, 130) shown in FIG. 1. With respect to compensation for nonlinearity and/or calibration errors that takes place in unit 130, the above-cited, U.S. application which was filed May 13, 2004 on behalf of Jose Marcos Laraia, Robert P. Moehrke, Jose G. Taveira, and originally entitled "Pade' Approximant Based Compensation for Integrated Sensor Modules and the Like" discloses a number of systems and methods for providing simultaneous calibration and compensation for nonlinear behavior of sensors in general. The disclosure of that above-cited, U.S. application is incorporated herein by reference as being usable for compensating for nonlinearities of, and providing calibration for, the sensor output path that includes the gain/offset calibration and nonlinearity compensating unit 130 of FIG. 1. Appropriate Pade' Approximant coefficient signals are fed to mapping unit 130 from the coefficients programming unit 150. Voltage output signal V$_d$ is understood to be a calibrated and more-linearized, analog counterpart to the temperature-compensated, voltage signal, V$_c$. If the temperature-compensating unit 120 is optionally omitted, then the voltage output signal V$_d$ will be understood to be a calibrated and more-linearized, analog counterpart to the peak-representing (and optionally filtered by 108) voltage signal, V$_b$. Also, if the temperature-compensating unit 120 is optionally omitted, then the nonlinearity compensating unit 130 may provide some temperature compensation per the disclosure of the above-cited U.S. application Ser. No. 10/845,681 by coupling signal 123 to unit 130, although as indicated, it is often difficult to simultaneously compensate for both of temperature sensitivity and nonlinearity of inductive sensors like 105 with a single step transformation.

Figure 4:
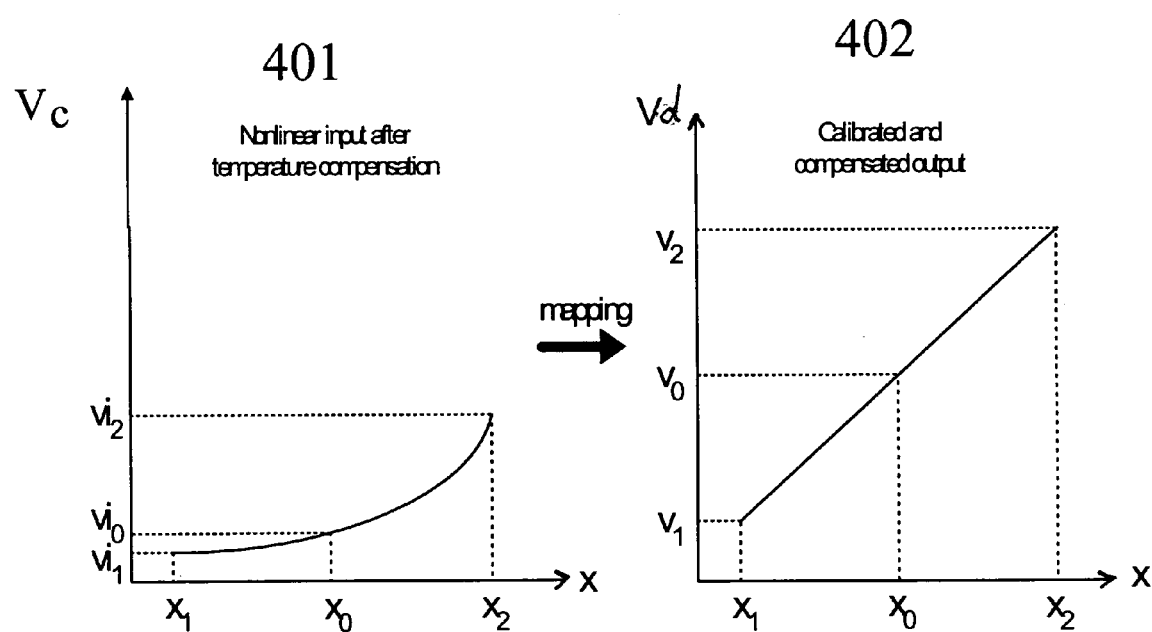
FIG. 4 is a schematic showing a mapping of a nonlinear and uncalibrated sensor response curve to a calibrated and linearized response curve.
Figure 5:
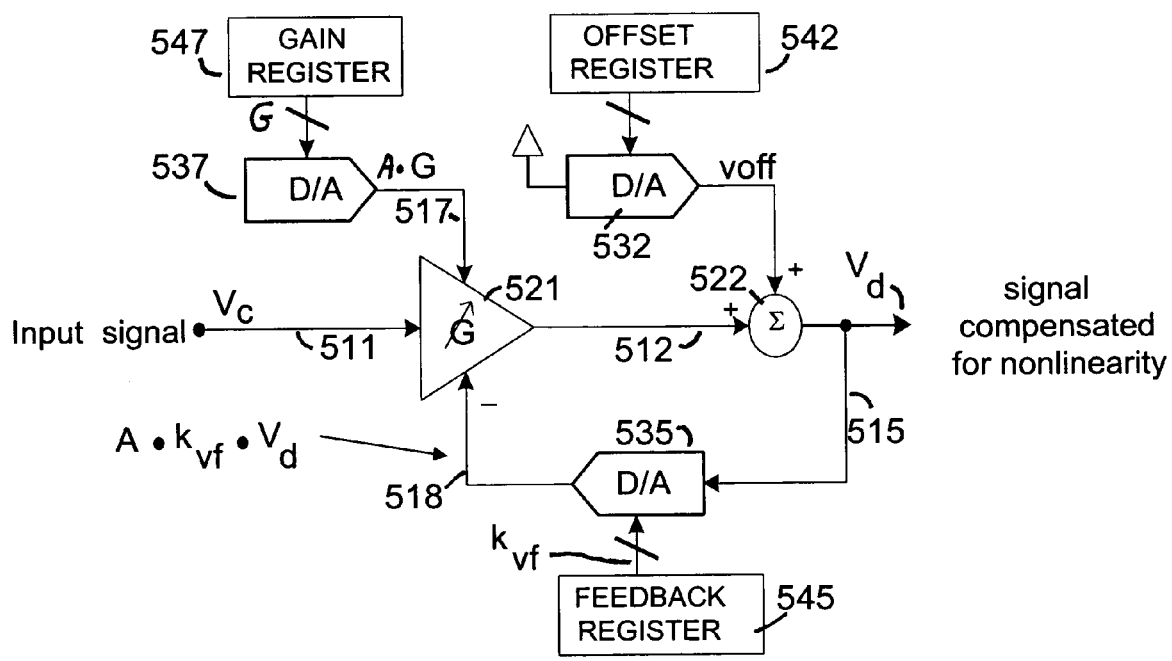
FIG. 5 is a schematic of a first order Padé Approximant compensating circuit that may be used in the sensor module of FIG. 1.

For purpose of completeness, FIGS. 4–5 illustrate the workings of one embodiment 500 of the many variants disclosed in the above-cited, U.S. application Ser. No. 10/845,681. In the voltage-versus-parameter magnitude graph 401 of FIG. 4, it is seen that the voltage signal V$_c$ coming from the temperature compensation block (120) is nonlinear with respect to the sensor input domain of P(t)=x1 to P(t)=x2. Also, the magnitude of voltage V$_c$ for a given parameter input value, say P(t)=x0 may vary from sensor to sensor, due to manufacturing tolerances or other variations amongst individual sensing elements. The problem may be seen as that of mapping the V$_c$(x) function within the domain, x1 to x2 into another function V$_d$(x), where V$_d$(x) is linear with respect to x and where V$_d$(x) further takes on at least calibrated values v1 and v2 when the sensed physical parameter P(t) is equal to x1 and x2, respectively. According to one method of the invention, the problem is solved mathematically by introducing a third calibrated point, x0, for example, about midway between x1 and x2, as is shown in FIG. 4. This creates a situation where there are three equations and three unknowns. The three unknown (Pade' Approximant coefficient signals) will be discussed shortly. The knowns are the x1, x2 and x0 calibration points on the physical parameter axis (X) and the corresponding V$_c$ voltages generated at those calibration points, namely, V$_{i1}$, V$_{i2}$ and V$_{i0}$, respectively, and the corresponding V$_d$ voltages to be generated for those calibration points, namely, V$_1$, V$_2$ and V$_0$, respectively.

It will be shown shortly in FIG. 5, that V$_d$ may be expressed as a first order Pade' Approximant of the form (Eq. 3):

$$V_d = \frac{a \cdot V_c + b}{c \cdot V_c + 1} \qquad \text{Eq. 3}$$

Since three co-related instances of V$_c$ and V$_d$ are known from the corresponding three calibration measurements at P(t)=x$_1$, x$_2$ and x$_0$; the three coefficients a, b, and c, may be determined by applying Cramer's rule to the system of three linear equations and three variables shown in Eq. 4.

$$\begin{cases} a \cdot Vi_0 + b - c \cdot Vi_0 \cdot V_0 = V_0 \\ a \cdot Vi_1 + b - c \cdot Vi_1 \cdot V_1 = V_1 \\ a \cdot Vi_2 + b - c \cdot Vi_2 \cdot V_2 = V_2 \end{cases} \qquad \text{Eq. 4}$$

The circuit implementation 500 of FIG. 5 adds a programmably determined, offset voltage, v$_{off}$ to the output signal 512 of a variable gain amplifier 521 having a programmable gain equal to G·(1−k$_{vf}$·V$_d$) where the magnitudes of G and k$_{vf}$ are also programmably determined. V$_c$ is the input voltage signal applied to the high impedance input terminal 511 of the amplifier 521. Digital-to-analog converter (DAC) 535 receives a digital k$_{vf}$ signal from register 545 and the analog output voltage signal V$_d$ by way of feedback path 515. In response, DAC 535 outputs an analog voltage signal on line 518 of a magnitude representing A·k$_{vf}$·V$_d$, where A is a voltage-to-gain conversion factor associated with amplifier 521. The voltage signal on line 518 is subtracted from the voltage signal on line 517 (A·G) to define the gain of the amplifier as G·(1−k$_{vf}$·V$_d$). In one embodiment, DAC 535 is a programmable attenuator formed as a switched set of capacitive voltage splitters that respectively obtain charge from line 515 and discharge the attenuated voltage onto line 518 so as to conserve power. Switched capacitance DAC's and/or switched capacitance adders may be used elsewhere in the circuit to conserve power.

Still referring to FIG. 5, register 547 stores a digital representation of the base gain value, G while DAC 537 produces a voltage signal representing A·G on line 517. Register 542 stores a digital representation of the offset voltage, $V_{off}$ while DAC 532 produces the corresponding voltage signal and applies it to one input terminal of voltage summing unit 522. A second input terminal 512 of voltage summing unit 522 receives the output voltage of amplifier 521. The following transfer function is realized (Eq. 5):

$$V_d = G \cdot (1 - k_{vf} * V_d) \cdot V_c + V_{off} \qquad \text{Eq. 5}$$

By shifting terms, the following equation, Eq. 6 may be realized.

$$V_d = \frac{G \cdot V_c + voff}{G \cdot k_{vf} \cdot V_c + 1} \qquad \text{Eq. 6}$$

Then, equation Eq. 3 may be reproduced by using the following substitutions of Eqs. 7a–7c.

$$\alpha = G$$

$$b = v_{off}$$

$$c = G \cdot k_{vf} \qquad \text{Eq. 7a–7c}$$

All the coefficients for compensation and calibration of an individual, given sensor (e.g., 105) may be stored in a programmable or re-programmable nonvolatile memory 151 such as PROM, EPROM, EEPROM or Flash through an appropriate digital programming interface 152 such as shown within unit 150 of FIG. 1. Every time the sensor module 100 is powered up, the programmably established coefficients can be downloaded from memory 151 into the respective registers to control the D/A converters and reproduce the desired results.

Although the temperature-compensating unit 120 is shown positioned upstream of the nonlinearity compensating unit 130 such that unit 130 receives the output of unit 120, it is within the contemplation of the invention to switch the order and to position unit 120 downstream of unit 130. The programmable coefficients of units 120 and 130 can be changed to provide the appropriate mapping from the output voltage, $V_b$ of the filter 108 to the error-corrected and calibrated output voltage, $V_e$ of the soon described, output interface unit 140.

In one embodiment, one or both of analog and digital output interfaces 140 and 150 are provided for allowing the sensor module 100 to communicate with the external world. Analog interface 140 can output the analog voltage signal $V_e$ as representing the sensed the physical parameter P(t) with relative good accuracy. Compensating unit 130 may provide linearizing compensation for the $V_e$ voltage signal rather than just for the $V_d$ signal. So the compensating combination of units 120 and 130 can essentially eliminate the temperature and nonlinear characteristics associated with the specific sensor 105 and with the specific electronic pathway between sensor 105 and output terminal 141 to produce the $V_e$ voltage signal as being representative of essentially just the sensed the physical parameter P(t). The input/output interfaces provided by blocks 140 and/or 150 may be analog or digital and may have one or more outputs. Analog interfaces may operate as voltage signals, current signals or time-based formats (pulse width modulation: PWM), or frequency based formats, where the represented output parameter is a linear function of the sensed physical variable P(t). Digital interfaces may be any of the standard bus interfaces, such as I2C, SPI, LIN Transceiver, CAN Transceiver, etc. Digital interface 152 converts the digital output signal 142 of unit 140 into the appropriate format. A representation of the digital output signal 142 may appear on a serial and bidirectional data terminal extending from unit 152 out of the sensor module package 101 while a corresponding serial clock signal is transmitted by another such terminal. Additional terminals provided to extend out of the sensor module package 101 may include the illustrated Vcc and GND terminals for providing power and ground voltages.

It should be noted that the temperature and/or nonlinearity compensations and calibration provided by the signal conditioning circuits (120, 130) may correct not only the sensor nonidealities and/or temperature drifts, but also those that would be introduced by the circuitry of the module, i.e., those of units 106, 108, 110 and/or 140. In other words, if some of the units in the sensor module 100 present respective degrees of nonlinearity or variations in response over temperature, correction for these can be "bundled" in with the corrections for the sensor nonidealities. The imperfections of units like 120 and 130 may be "self-corrected" by selection and storage of appropriate coefficients in memory unit 151. Thus, even though the circuitry of units 106, 108, 110, 140, 120 and/or 130 may be of relatively low-performance quality, the self-correction feature compensates for this and thereby provides lower cost system having generally better overall accuracy than prior art signal conditioning solutions that do not self correct.

Figure 6:
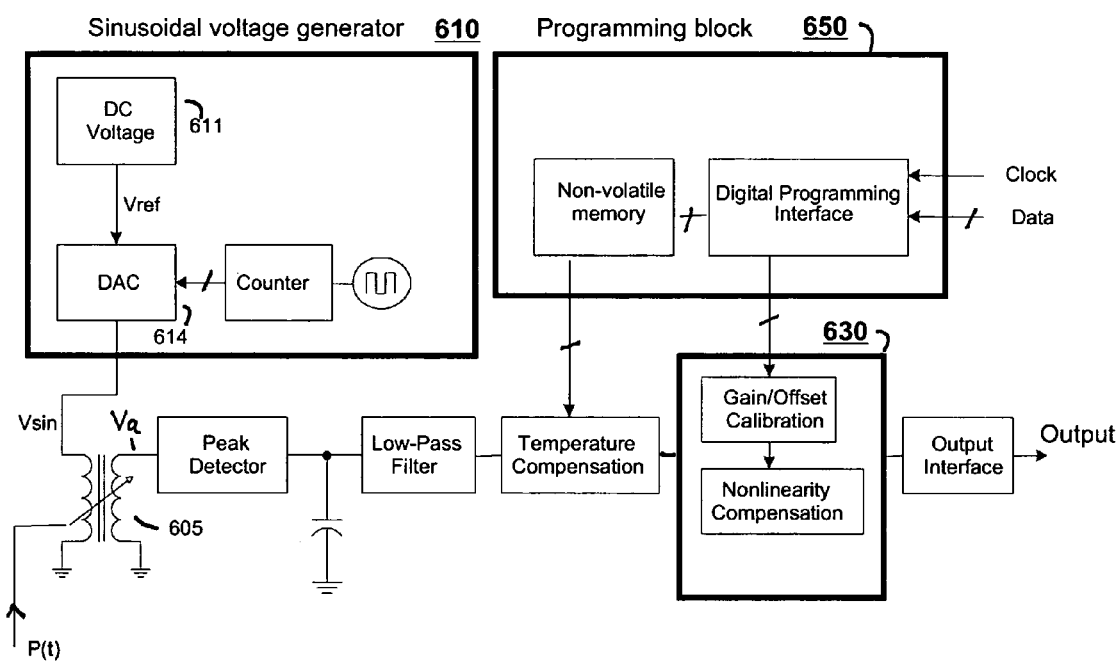
FIG. 6 is a schematic of another sensor module in which a reactive sensor having variable mutual inductance is used.

Referring to FIG. 6, a second embodiment 600 is shown that includes a mutual inductance sensor 605 having multiple coils. In this case, the excitation signal may be applied as a sinusoidal voltage signal, $V_{sine}$, to a primary coil of the sensor 605 and the parameter-dependent, sensor output signal $V_a$ may be generated across the secondary coil. The ratio of the sensor output signal $V_a$ to the primary excitation signal, $V_{sine}$, may be made function of the physical parameter P(t) that is being measured. Unit 611 may be a voltage reference in this case while DAC 614 converts the digital output signal of the waveform counter into a corresponding voltage signal, $V_{sine}$. The primary excitational signal, $V_{sine}$, can be any appropriate periodic voltage signal, including of course, quasi-sinusoidal or triangular or sawtooth or trapezoidal. The remaining processing blocks of FIG. 6 may be made substantially the same as corresponding ones in the embodiment of FIG. 1.

Figure 7:
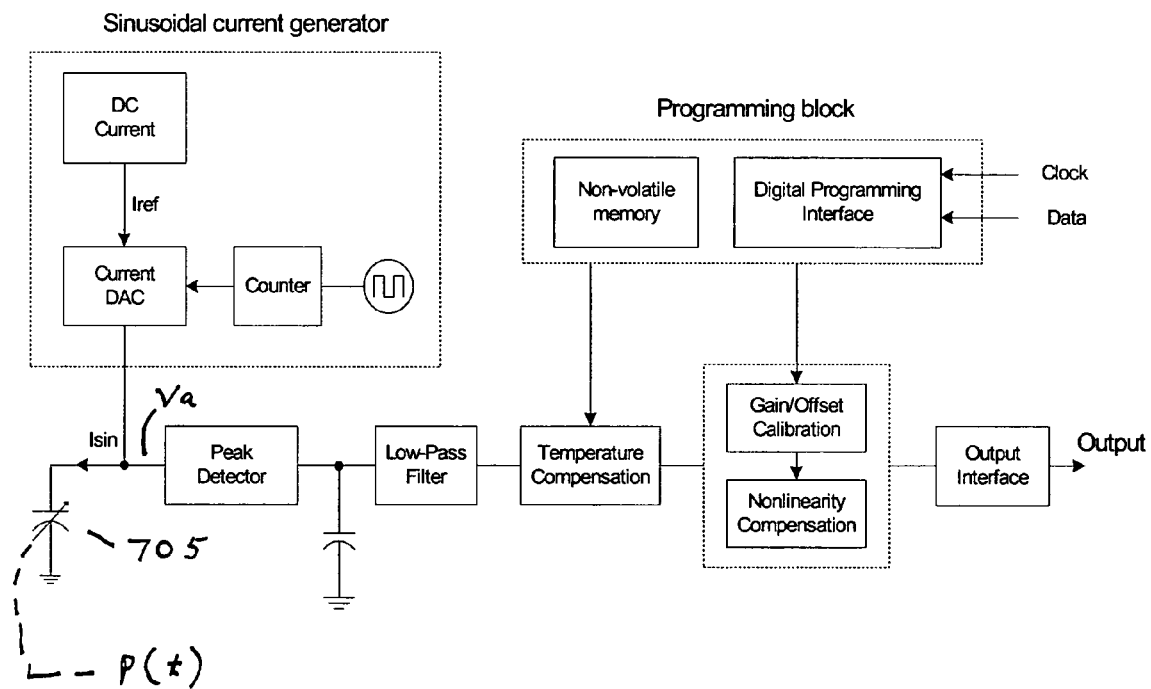
FIG. 7 is a schematic of another sensor module in which a reactive sensor having variable capacitance is used.

Referring to FIG. 7, a third embodiment 700 is shown that includes a capacitive sensor 705. Otherwise, the circuit architecture is substantially the same as the one described in the embodiment of FIG. 1. Sensor 705 reactively converts the excitational current signal into a voltage signal $V_a$ that is a function of the physical parameter P(t) that is being measured.

Figure 8:
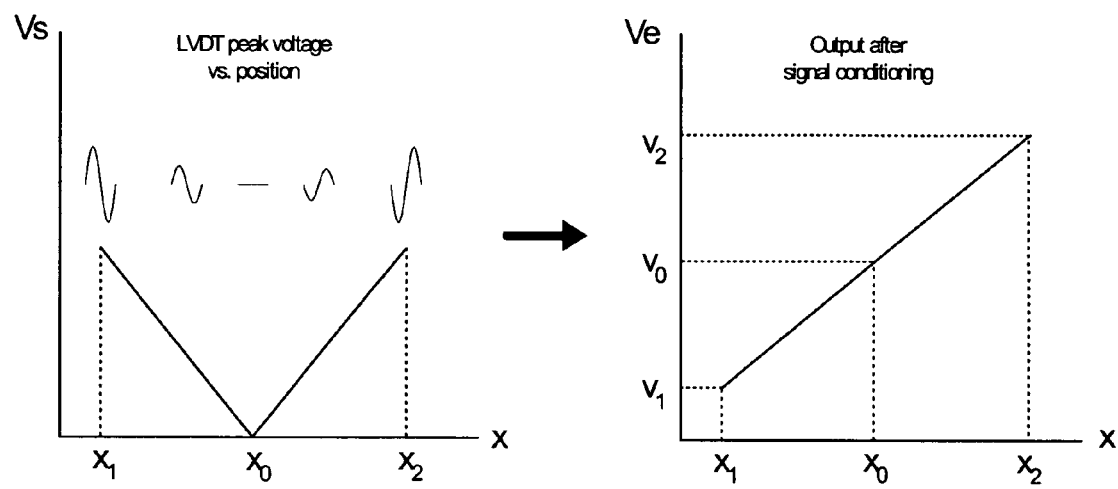
FIG. 8 shows a mapping from a first graph representing a sensor with piecewise different response regions, where the mapping is to a second graph representing a linearized and calibrated output signal corresponding to a same physical input parameter (x)
Figure 9:
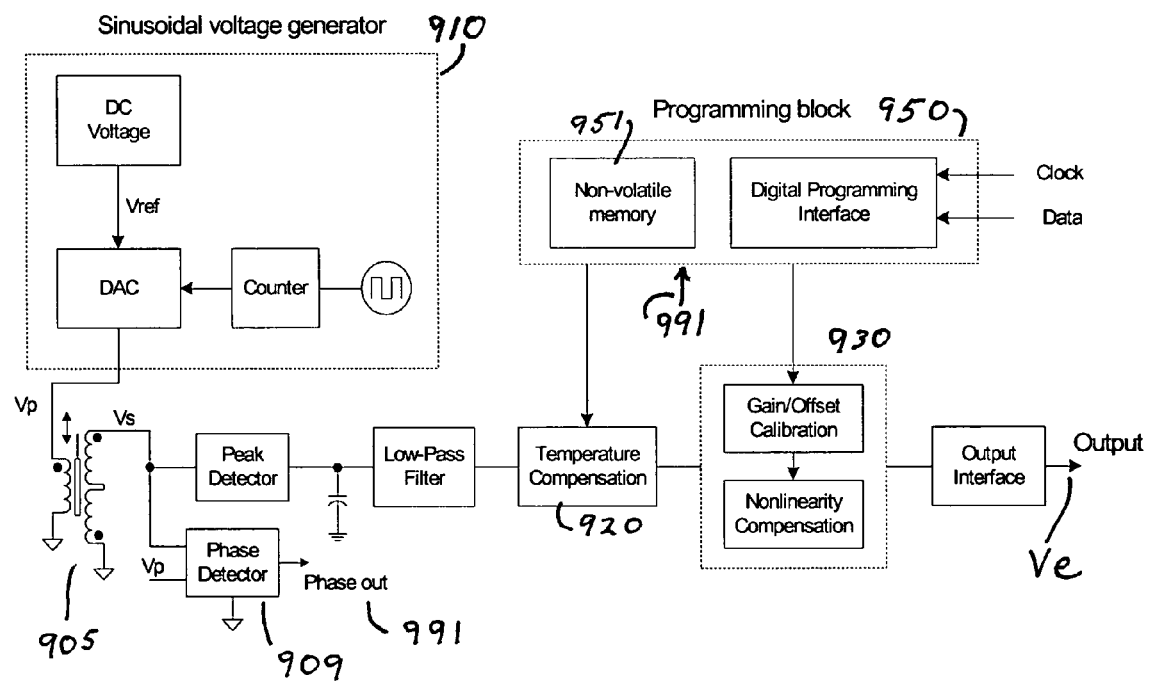
FIG. 9 is a schematic of another sensor module in which a LVDT-type reactive sensor is used.

Referring to FIGS. 8 and 9, the sensor 905 may include an LVDT-type structure that produces at least one null voltage output, $V_s = 0$ when the core member is at a center position, $x_0$. Moving the core member from the center null to either direction causes the secondary windings signal, $V_s$ to increase in a relatively symmetrical fashion, but with the phase of $V_s$ changing depending on which of the opposite directions was taken. In such a case, it may be desirable to determine the phase of $V_s$ relative to the primary excitational signal, $V_p$. More generally speaking, null-producing reactive sensors may be structured to produce one or more null outputs at specific values of the to-be-measured parameter P(t) through the use of signal cancellation. It is generally desirable to determine which side of a corresponding null, the null-producing reactive sensor is operating in. As such, it is within the contemplation of the disclosure to generally provide an appropriate, side-of-null determining means for determining which side of a corresponding null, the null-producing reactive sensor is operating in. The specific operation of the side-of-null determining means will depend on the idiosyncrasies of the corresponding null and null-producing reactive sensor.

FIG. 9 shows a fourth embodiment 900 suitable for use with an LVDT-type 905 of null-producing reactive sensor where the side of null can be identified by the phase relationship between the primary and secondary voltages. A phase detector 909 is coupled to both the primary and secondary voltages, $V_p$ and $V_s$, so a determination can be made as to which side of null the sensor core is at. In some cases, LVDT output to each side of the null point is different and a different linearity correction function may be called for as well as different calibration points for each side out from null. In one embodiment, coefficients for LVDT calibration and/or temperature compensation are determined independently for each direction from the center null so as to provide linear or nonlinear response output, depending on application requirements. After the two independent (and usually different) sets of coefficients are determined and stored in memory 951, the output signal 991 from the phase detector 909 can be used as a memory address bit for determining which one of the independent coefficient sets should be used at each occasion.

Figure 10:
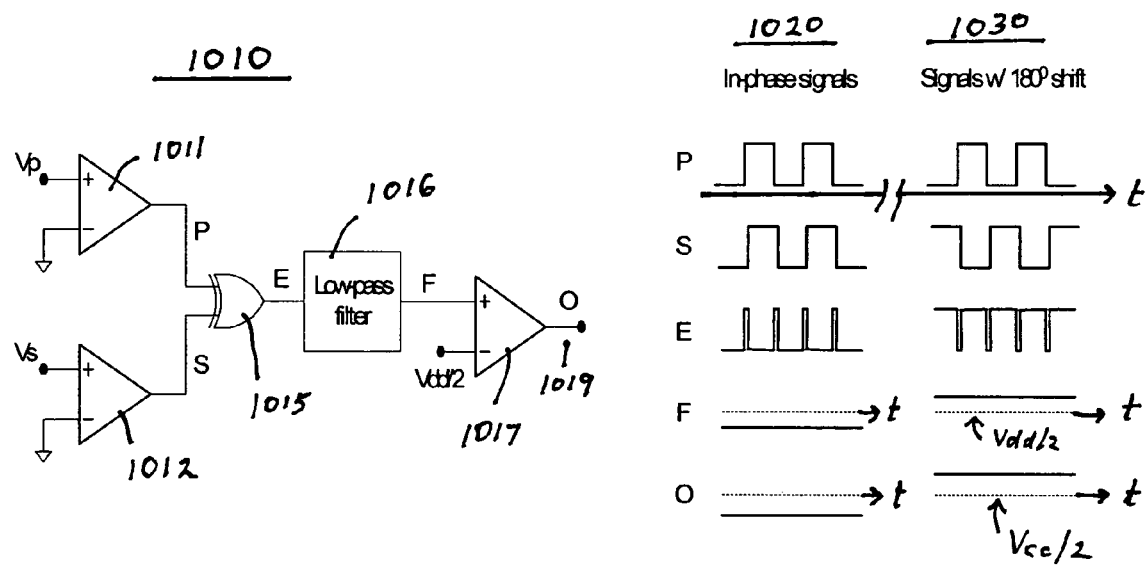
FIG. 10 is a schematic diagram of a phase detector that may be used in the sensor module of FIG. 9.

Referring to FIG. 10, LVDTs typically exhibit a relatively small phase shift as between primary and secondary voltage signals ($V_p$ and $V_s$), often about 10° to 15° at the nominal operating frequencies although it could be less. Also, the LVDT secondary windings are usually tied together in a series-opposing configuration, so their signals are 180° out of phase and of different magnitudes depending on which side of null the movable core member is positioned at. The series-generated secondary output voltage signal, $V_s$, can be close to being in-phase with the primary voltage signal, $V_p$, or it can be close to being 180° out-of-phase with the primary voltage signal, $V_p$, depending on which side of null the LVDT type sensor is operating at. These properties may be used by the phase detector circuit 1010 of FIG. 10 to determine whether the LVDT secondary signal is approximately in-phase or out-of-phase with respect to the primary signal. This way, it can be determined in which side the LVDT core is with respect to the central null point. The illustrated LVDT phase detector 1010 includes zero-cross comparators for the primary and secondary voltage signals ($V_p$ and $V_s$) that compare the overlap of these signals relative to a coil DC reference voltage (coil ground). More specifically, amplifiers 1011 and 1012 have high input impedance and generate respective, amplified signals, P and S from the $V_p$ and $V_s$ signals. In one embodiment, P and S saturate to form essentially digital signals as is shown in the voltage versus time graphs at 1020 and 1030. Exclusive OR gate 1015 generates a corresponding XOR output signal, E as is shown at 1020 and 1030. The E signal is typically formed as a pulse train whose frequency is twice that of the input signals and whose pulse widths equals the delay between zero crossings of the $V_p$ and $V_s$ signals. A low pass filter 1016 converts the narrow E pulses into a roughly DC, voltage level F that is either above or below a predetermined threshold, Vdd/2, i.e. half the supply voltage. Comparator 1017 converts the F signal into a digitally saturated, logic low or logic high, thereby indicating whether the core member is on one side or the other of null. One or more of comparators 1011, 1012 and 1017 may have a predetermined amount of hysteresis built into it to prevent "chattering" from occurring near null. XOR gate 1015 may have some hysteresis built into it to prevent "chattering" from occurring with noisy signals.

The O output signal of comparator 1017 may be used in one of several ways. In one embodiment, one from two sets of coefficients is downloaded on-the-fly into the temperature and/or nonlinearity compensating circuits (e.g. 120, 130 of FIG. 1) according to the phase detector output. In an alternate embodiment, a plurality of calibration circuits are provided, each one with its own set of coefficients. An analog multiplexer select one of the circuits for providing temperature and/or nonlinearity compensation in response to the phase detector output signal 1019. The former method is simpler but may generate output spikes during transitions through the center null. The latter approach may be more desirable when these spikes are not adequately filtered out by the output interface.

Figure 11:
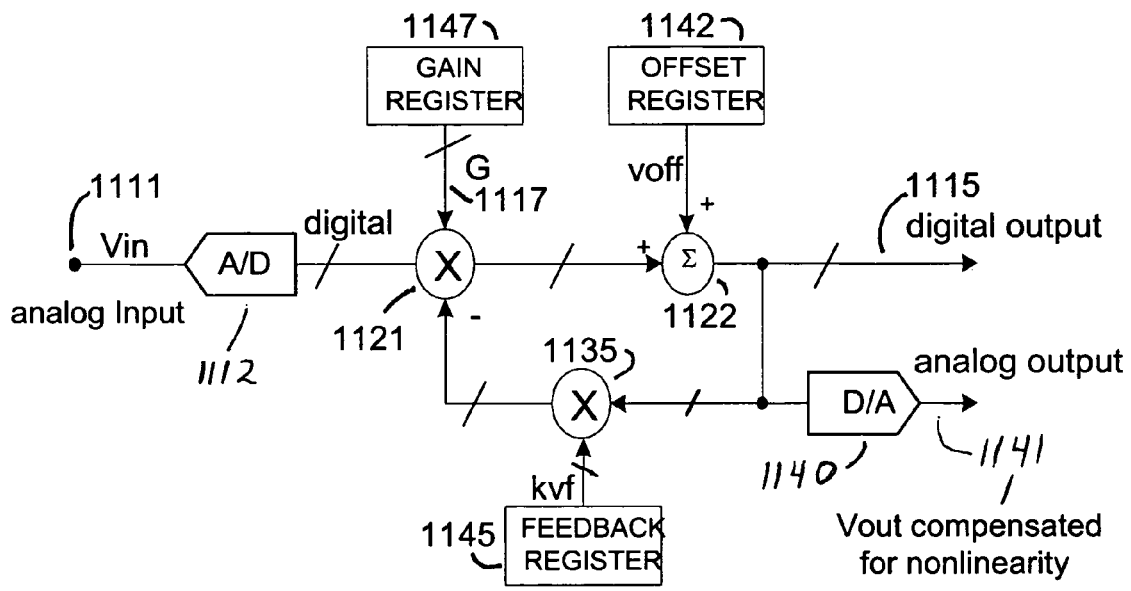
FIG. 11 is a schematic of another Padé Approximant compensating circuit that may be used in the sensor modules of the present disclosure.

Referring to FIG. 11, a schematic diagram is provided of another Padé Approximant compensating circuit 1100 that may be used in the sensor modules of the present disclosure. Lines carrying digital signals are denoted in FIG. 11 by slashes extending through those lines. Thus it may be understood that except for the analog input signal 1111 ($V_{in}$) entering A/D converter 1112 and the analog output signal 1141 ($V_{out}$) exiting D/A converter 1140, essentially all of the other signals are digital. Digital multiplier 1121 performs a digital counterpart to the analog function performed by amplifier 521 in FIG. 5. Summing unit 1122 similarly performs a digital counterpart to the analog summing function performed by unit 522 in FIG. 5. Digital multiplier 1145 performs a digital counterpart to the analog function performed by D/A unit 535 in FIG. 5. There is no need in FIG. 11 for counterparts to the D/A converters 537 and 532 of FIG. 5 because digital units 1121 and 1122 can respectively accept the digital representations of the G and $V_{off}$ values directly from registers 1147 and 1142. The digital output signal 1115 may be converted into serial form for output via the serial output link (not shown in FIG. 11) of the sensor module.

Many variations may be made to the exemplary embodiments discussed thus far. In one user-programmable embodiment, a monolithic integrated circuit having the combined architectures of FIGS. 1 and 9 is provided where the waveform generator 110/910 is programmably switchable between a current generating mode and a voltage generating mode and use of the in-chip phase detector 909 may be programmably switched on or off depending on what kind of sensor is being used (LVDT-type 905 or a simpler mutual inductance type 605 or a yet simpler, single coil type 105). The invention therefore provides a single monolithic integrated circuit that is user programmable for use with many different types of reactive sensors and which provides compensation for temperature variation, nonlinearity of sensor response and for calibration of the module output function relative to standardized physical parameter settings. The simple, and low cost combination of a single IC together with a simple coil (105) and a crystal timing reference (115) can be packaged in a compact housing (101) to provide a highly accurate measurement of a given physical parameter P(t). It is, of course, within the contemplation of the invention to package plural ones of such sensors in a same housing and to provide a corresponding plurality of such sensor-supporting IC's, and/or an IC that will support plural sensors and interface with a common serial data bus. For example, one coil may be oriented to sense displacement in the x direction while another coil may be oriented to sense orthogonal displacement in, say the y direction. The invention is suitable for embedded systems such as adjacent to magnetic, movable parts of an automobile so that angular or other displacement of such parts can be accurately measured.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A system comprising:
   (a) a reactive sensor that is responsive to a variable physical parameter;
   (b) a waveform generator for supplying an excitational signal to the reactive sensor;
   (c) a detector for detecting a response of the reactive sensor to the excitational signal and to the physical parameter, and for outputting a detection signal representing said response of the reactive sensor; and
   (d) a digitally programmable compensating circuit which includes a Pade Approximant mapping unit for mapping the detection signal or another response-representing signal derived from the detection signal into a corrected response-representing signal that more accurately represents the variable physical parameter.

2. The system of claim 1 wherein:
   (d.1) the digitally programmable compensating circuit further includes a temperature compensating unit which is responsive to temperature variations and responsively generates said another response-representing signal.

3. The system of claim 1 wherein:
   (a.1) the reactive sensor includes a variable inductance element.

4. The system of claim 3 wherein:
   (a.2) the variable inductance element has a single coil.

5. The system of claim 1 wherein:
   (a.1) the reactive sensor includes a mutual inductance element.

6. The system of claim 5 wherein:
   (a.2) the mutual inductance of the mutual inductance element varies as a function of the variable physical parameter;
   (a.2) the mutual inductance element includes a primary winding and at least one secondary winding;
   (b.1) the waveform generator is coupled to supply the excitational signal to the primary winding; and
   (c.1) the detector is coupled to the at least one secondary winding for detecting the response of the reactive sensor to the excitational signal and to the physical parameter.

7. The system of claim 1 wherein:
   (a.1) the reactive sensor includes a variable capacitance element.

8. The system of claim 1 wherein:
   (a.1) the reactive sensor includes a null-producing element that produces one or more null outputs at specific values of the under-measure, variable physical parameter; and the system further comprises:
   (e) a side-of-null detector for determining which side of a corresponding null the null-producing element is operating in.

9. The system of claim 8 wherein:
   (d.1) the digitally programmable compensating circuit is responsive to the side-of-null detector so as to provide different compensation depending on which side of a corresponding null the null-producing element is operating in.

10. The system of claim 8 wherein:
    (e.1) the side-of-null detector includes a phase detector.

11. The system of claim 1 wherein:
    (d.1) the Pade Approximant mapping unit comprises:
    (d.1a) a variable gain amplifier, operatively coupled to receive the detection signal or the other response-representing signal derived from the detection signal as an input signal, the amplifier having at least a first input terminal, an output terminal, and a gain control terminal;
    (d.1b) a first summer, operatively coupled to the output terminal of the variable gain amplifier for adding in a first offset signal;
    (d.1c) a first multiplier, operatively coupled to an output of the first summer and coupled to receive a programmably-established proportional feedback factor signal and for correspondingly generating a multiplied feedback signal; and
    (d.1d) a second summer, operatively coupled to receive a programmably-established gain factor signal and to correspondingly cause the gain of the variable gain amplifier to be function of the programmably-established gain factor signal and the multiplied feedback signal.

12. The system of claim 11 wherein the digitally programmable compensating circuit further comprises:
    (d.2) coefficient defining means, coupled to at least one of the first summer, first multiplier, second summer for respectively defining at least one of the first offset signal, proportional feedback factor signal, and gain factor signal.

13. The system of claim 12 and further comprising:
    (e) a temperature sensor operatively coupled to the coefficient defining means for causing the coefficient defining means to define at least one of the first offset signal, proportional feedback factor signal, and gain factor signal in response to a sensed temperature.

14. The system of claim 1 and further comprising:
(e) a housing enclosing at least part of the reactive sensor and further enclosing at least one of the waveform generator, the detector and the digitally programmable compensating circuit.

15. The system of claim 14 wherein:
(e.1) the housing further encloses a digital interface unit that provides serial data communication between a node outside the housing and one or more of said waveform generator and digitally programmable compensating circuit.

16. The system of claim 14 wherein:
(e.1) the housing further encloses a printed circuit board to which the at least part of the reactive sensor is mounted and an integrated circuit package, where the package contains one or more of said waveform generator, detector and the digitally programmable compensating circuit.

17. A method comprising:
(a) synthesizing a sensor exciting signal;
(b) applying the exciting signal to a reactive sensor where the reactive sensor is modulated by a variable physical parameter;
(c) detecting a response of the reactive sensor to the combination of the exciting signal and the physical parameter, and outputting a corresponding detected response signal; and
(d) transforming the detected response signal to a corrected response signal by use of at least one Pade Approximant compensating circuit.

18. The method of claim 17 wherein said steps of synthesizing, detecting and transforming are substantially carried out within a monolithic integrated circuit.

19. The method of claim 17 wherein said synthesizing includes:
(a.1) receiving a timing reference signal;
(a.2) generating a voltage or current reference signal; and
(a.3) using a digital-to-analog converter to generate a stepped series of analog voltage or current magnitudes where said magnitudes are multiples of the generated voltage or current reference signal and the timing of said steps is determined by the received timing reference signal.

20. The method of claim 19 and further comprising:
(a.4) programmably establishing said multiples of the generated voltage or current reference signal.

21. The method of claim 17 wherein said detecting includes:
(c.1) determining when a roughly peak magnitude of a voltage pulse has occurred; and
(c.2) storing into a capacitor an amount of charge representative of the magnitude of the voltage pulse at the time that when the magnitude is determined to have been roughly the peak magnitude of the voltage pulse.

22. The method of claim 17 wherein said transforming includes:
(d.1) using a variable gain amplifier that receives a time variant gain signal that is a function of a transformation output signal.

23. The method of claim 17 wherein said transforming includes:
(d.1) providing a temperature correction factor separately from providing nonlinearity correction.

24. The method of claim 17 wherein said transforming includes:

(d.1) using programmably stored coefficients to define Pade Approximant coefficients of the at least one Pade Approximant compensating circuit.

25. The method of claim 24 wherein at least one set of programmably stored coefficients for defining a corresponding set of Pade Approximant coefficients is a calibrated set that establishes a predefined transformation output signal in response to a predefined setting of the variable physical parameter.

26. A method of calibrating a sensor module where the module includes a reactive sensor that is responsive to a combination of a variable physical parameter and an excitational signal, the method comprising:
(a) applying an exciting signal having an AC component to the reactive sensor;
(b) setting the physical parameter to at least three predefined and measurable values;
(b) providing a programmable transforming unit that operates in accordance with a Pade' Approximant ratio having respective numerator and denominator coefficients; and
(c) programmably adjusting the transforming unit to thereby establish respective numerator and denominator coefficients that cause the transforming unit to provide a desired Pade' Approximant mapping between an input signal that is derived from a response of the sensor to said exciting signal and to the at least three predefined and measurable values of the physical parameter and a corresponding output signal having a corresponding at least three standardized output values corresponding to said at least three predefined and measurable values of the physical parameter.

27. The method of claim 26 and further comprising:
(e) applying a temperature compensating transformation to at least one of the input signal that is derived from the response of the sensor and an output signal generated by the programmable transforming unit.

28. A method comprising:
(a) applying to a reactive sensor at least three different physical parameters and an excitational signal;
(b) determining a corresponding, at least three responses of the sensor to the at least three different physical parameters and the excitational signal; and
(c) determining coefficients for a Pade' Approximant mapping unit for mapping the at least three responses of the reactive sensor to a corresponding at least three output signals where the corresponding at least three output signals are predetermined.

29. A sensor module comprising:
(a) a housing;
(b) at least one portion of a reactive sensor within the housing and providing a sensor output signal;
(c) a waveform generator for generating an exciting signal that excites the reactive sensor, the waveform generator being within the housing;
(d) a mapping circuit that maps a sensor response signal that is representative of a response of the excited sensor into a calibrated output signal in accordance with at least a first Pade' Approximant mapping function having three or more mapping coefficients, the mapping circuit being within the housing; and
(e) a digital interface circuit for providing control and data interfacing between at least the mapping circuit and a predefined data link extending outside the housing, where the digital interface circuit is within the housing.

30. An integrated circuit comprising:
(a) a waveform generator for generating an exciting signal that will excite a reactive sensor, where the excited sensor can then respond to an applied physical parameter that is to be measured;
(b) a detector for detecting a response of the excited sensor to the applied physical parameter and for outputting a corresponding detection signal; and
(c) a digitally programmable compensating circuit which includes a Pade Approximant mapping unit for mapping the detection signal or another response-representing signal derived from the detection signal into a corrected response-representing signal that more accurately represents the variable physical parameter.

31. The integrated circuit of claim 30 and further comprising:
(d) a phase detector operatively coupled to the compensating circuit for changing a behavior of the compensating circuit in response to a detected phase relationship of signals in the sensor.

32. The integrated circuit of claim 30 and further comprising:
(d) a digital interface circuit for providing control and data interfacing between at least the programmable compensating circuit and a predefined data link extending outside the integrated circuit.

33. The integrated circuit of claim 30 wherein said waveform generator is digitally programmable to generate different, programmably defined exciting signals.

34. The integrated circuit of claim 30 wherein said waveform generator includes on on-chip timing reference.

35. The integrated circuit of claim 30 wherein said Pade Approximant mapping unit includes:
(c.1) a first digital multiplier;
(c.2) a digital adder coupled to an output of the first digital multiplier; and
(c.3) a second digital multiplier coupled to an output of the digital adder.

* * * * *

UNITED STATES PATENT AND TRADEMARK OFFICE
CERTIFICATE OF CORRECTION

| | |
|---|---|
| PATENT NO. | : 7,006,938 B2 |
| APPLICATION NO. | : 10/870314 |
| DATED | : February 28, 2006 |
| INVENTOR(S) | : Laraia et al. |

It is certified that error appears in the above-identified patent and that said Letters Patent is hereby corrected as shown below:

Title Page, Item (57)

Abstract: Should Read

Reactive sensors typically exhibit nonlinear response. Systems and methods are disclosed for compensating for the nonlinear and/or temperature dependent behavior of reactive sensors and for calibrating the post-compensation output signals relative to known samples of the physical parameter under measure. One class of embodiments includes a housing containing at least part of a reactive sensor, a monolithic integrated circuit and a timing reference. The integrated circuit includes a waveform generator for generating a sensor exciting signal, a detector for detecting the response of the sensor to the combination of the exciting signal and the under-measure physical parameter, a temperature compensating unit and a Pade Approximant nonlinearity compensating unit. Coefficients of latter two units are tuned to compensate for nonlinearity and temperature sensitivity.

Signed and Sealed this

Twenty-first Day of August, 2007

JON W. DUDAS
*Director of the United States Patent and Trademark Office*